Patented May 23, 1944

2,349,752

UNITED STATES PATENT OFFICE 2,349,752

TREATMENT OF ALLYL TYPE HALIDES

Maxwell A. Pollack, Akron, Ohio, assignor to Pittsburgh Plate Glass Company, Alleghany County, Pa., a corporation of Pennsylvania No Drawing. Application November 22, 1940, Serial No. 366,728

6 Claims. (Cl. 260—654)

This invention relates to the methods of separating allyl type halides from halo-olefin mixtures containing the same. In the manufacture of allyl type halides by halogenation of olefins or by dehydrohalogenation of dihalo aliphatic hydrocarbons, mixtures of allyl type halides and other halo-olefins are secured. Thus, upon chlorination of propylene at temperatures above 200° C., a mixture is produced which contains allyl chloride and vinyl type halides in which the halogen is attached to an unsaturated carbon atom. Separation of these halides is often difficult since they possess boiling points which are approximately the same and fractionation by distillation is difficult.

In accordance with my invention, I have found that the allyl type halides may be separated from the vinyl type halides by subjecting the mixture to the action of ammonia or an organic amine. In such a case the allyl type halide is found to react with the amine to form the corresponding quaternary ammonium halide while the vinyl type halides are substantially unaffected. The quaternary halides thus obtained are, in general, viscous liquids or crystalline solids and generally are soluble in water. They may be separated from the vinyl type halide by filtration, by washing with water, or by distillation of the vinyl halide, or by other means in order to remove the quaternary ammonium halide from the vinyl halide. Numerous novel compounds may be secured by this means. These compounds may be utilized as such for many purposes such as insecticides, manufacture of dyestuffs, detergents, treatment of wool, cotton, and other fibrous materials, etc. If desired, however, the quaternary compound may be pyrolized in order to separate the amine and the halide. The amine may thereafter be recycled.

The invention is particularly effective in serving as a means for separating allyl chloride or similar chloride from a mixture containing other chlorolefins such as 1-chloropropene-1, and 2-chloropropene-1, which are often present in admixture with the allyl or similar chloride. In addition, the invention may be applied to the treatment of other halide mixtures containing allyl type halides which comprise the grouping

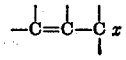

where $x$ is halogen and vinyl type halides which comprise the grouping

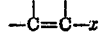

where $x$ is halogen. Thus, the reaction mixtures obtained by chlorination by allylic substitution of propylene, butylene, isobutylene, amylene, etc., or by dehydrochlorination of propylene dichloride, butylene dichloride, etc. may be treated in accordance with the invention.

Various amines are found to be suitable. Dimethyl aniline has been found to be particularly applicable and it has been found that upon treatment of a mixture of allyl and vinyl type halides with this compound and pyrolysis of the quaternary ammonium halide, very good recovery of the allyl halide was secured. Other alkyl anilines or other alkyl aryl amines such as dimethoxy, diethoxy, diethyl, dipropyl, dibutyl, distearyl, dioleyl, dilauryl, diallyl, dimethallyl, methallyl methyl, methyl ethyl or ethyl allyl aniline, etc. may be utilized to form dialkyl, alkenyl, phenyl ammonium halides or other compounds of the general formula

where X is halogen, $R_1$ is an aryl radical such as phenyl, cresyl, benzyl, naphthyl, etc. $R_2$ is an unsaturated radical, particularly radicals wherein the unsaturated linkage is separated from the nitrogen atom by at least one carbon atom and $R_3$ and $R_4$ are organic radicals.

Other amines such as trimethyl, triallyl, triethyl, tristearyl, or dodecyl dimethyl, cetyl dimethyl, octadecyl dimethyl, or octyl dimethyl amines, p-alpha, alpha, gamma, gamma tetramethyl butylphenoxyethoxy ethyl morpholine, N-octadecyl dimethyl amine, N-p-alpha gamma gamma tetramethylbutyl phenoxyethoxy-ethoxy ethyl piperidine, dodecyl oxyethyl-dimethyl amine, N-octyl-N-dibenzyl amine, N-cetyl-N-dibenzyl amine, p-tertiary amyl phenoxyethyl-N-dimethyl amine, dodecyl-diethanolamine, quinoline, and pyridine and substituted pyridines and quinolines, N-methyl piperidine, or other N-alkyl, N-alkyloxy, N-aryl, or N-aryloxy substituted piperidine may be used.

The reaction may be conducted in the absence of applied heat, or if desired, the reaction mixture may be heated, for example, to a temperature of 50 to 100° C. or above. Organic solvents or diluents such as acetone or dioxane may be introduced, if desired.

Following the removal of the quaternary halide the compound may be decomposed to produce allyl type halides or their derivatives. For example, the halides may be pyrolyzed at suitable temperatures to regenerate the amine and allyl type halide. Alternatively, the quaternary halide may be treated with alkalies to form the corresponding hydroxides which may be pyrolyzed to form allyl type alcohols, or the compound may be treated with salts of organic acids to form the corresponding quaternary ammonium salts of such acids which may be pyrolyzed to recover the amine and an allyl type ester.

The following examples are illustrative:

*Example I*

A mixture containing approximately 60 parts by weight of allyl chloride and 40 parts by weight of a mixture of 1-chloro-propene and 2-chloro-propene-1 was mixed with N,N-dimethyl aniline in the proportion of 2 moles of dimethyl aniline per mole of allyl chloride and a few drops of morpholine was added. The mixture was heated under a reflux condenser for 100 hours at a temperature of approximately 60 to 65° C. A hygroscopic brown-colored salt was formed. This salt was removed by filtration from the residual vinyl type chloride. Upon heating the salt (dimethyl allyl phenyl ammonium chloride) at 145° C. for 30 minutes, pyrolysis occurred and allyl chloride and dimethyl aniline were produced. These materials were separated by fractionation.

*Example II*

The process described in Example I was repeated using diethyl aniline, heating the mixture containing allyl chloride at 80° C. Substantially all of the allyl chloride present in the original mixture was recovered after pyrolysis of the quaternary halide at 141–143° C.

While the present invention has been described with particular reference to the separation of allyl and vinyl type halides, it may also be applied to the separation of allyl chloride or similar allyl type halide from other less reactive halides such as aryl halides, for example, phenyl chloride or other chloro benzene, diphenyls, naphthalenes, or primary aliphatic halides such as isopropyl chloride or N-propyl chloride, isobutyl chloride or aliphatic polyhalides such as dichloropropane, dichlorobutane, etc. or to the separation of other unsaturated halides wherein the halogen is attached to a saturated carbon atom such as oleyl, or linoleyl chloride from vinyl or other less reactive halides.

Although the present invention has been described with reference to the specific details of certain embodiments thereof, it is not intended that such details shall be regarded as limitations upon the scope of the invention except insofar as included in the accompanying claims.

I claim:

1. A method of separating an alkenyl halide having the halogen attached to a saturated carbon atom which is immediately adjacent an unsaturated carbon atom, from a liquid mixture containing said alkenyl halide and another halide having the halogen attached to an unsaturated carbon atom, which comprises treating said mixture with a tertiary amine to form a quaternary ammonium halide by reaction with said alkenyl halide, separating the solid quaternary ammonium compound from the residual liquid, decomposing the quaternary ammonium compound by heating and recovering the said alkenyl halide.

2. A method of separating an allyl chloride from a liquid mixture containing said allyl chloride and other unsaturated hydrocarbon chlorides having the halogen attached to unsaturated carbon atoms, which comprises treating said liquid mixture with a tertiary amine to form a solid quaternary ammonium compound, separating said quaternary ammonium compound from the residual liquid, decomposing the quaternary ammonium compound by means of heat and recovering said allyl chloride.

3. The method of claim 1 in which the tertiary amine is bis (N-methyl) aniline.

4. A method of separating allyl chloride from a mixture of propenyl chlorides which comprises treating the mixture with a tertiary amine to precipitate a substantial quantity of a quaternary ammonium chloride, separating said quaternary ammonium compound from the residual liquid, decomposing the quaternary ammonium compound by means of heat and recovering allyl chloride.

5. The method of claim 1 in which the tertiary amine is pyridine.

6. The method of claim 1 in which the tertiary amine is bis (N-ethylaniline).

MAXWELL A. POLLACK.